(12) United States Patent
Lindeman et al.

(10) Patent No.: US 8,428,096 B2
(45) Date of Patent: Apr. 23, 2013

(54) REMOVABLE FILLER MODULE

(75) Inventors: Fred Lindeman, Dubuque, IA (US);
Stephen Coates, Galena, IL (US);
William R. Materna, Galena, IL (US);
Timothy Park, Dubuque, IA (US)

(73) Assignee: Merkle International, Inc., Galena, IL (US)

( * ) Notice: Subject to any disclaimer, the term of this patent is extended or adjusted under 35 U.S.C. 154(b) by 1244 days.

(21) Appl. No.: 11/799,673

(22) Filed: May 1, 2007

(65) Prior Publication Data
US 2008/0271656 A1    Nov. 6, 2008

(51) Int. Cl.
F27D 1/02    (2006.01)
F27D 1/00    (2006.01)
F23M 5/06    (2006.01)
F23M 5/02    (2006.01)

(52) U.S. Cl.
USPC ............... 373/73; 373/71; 110/331; 110/332; 110/339

(58) Field of Classification Search ............... 373/71–73; 110/339, 341, 331, 334–338, 332, 308; 432/76; 65/182.1, 182.3, 182.4, 182.5, 346
See application file for complete search history.

(56) References Cited

U.S. PATENT DOCUMENTS

| | | | |
|---|---|---|---|
| 2,116,202 A | 5/1938 | Honegger | |
| 2,509,228 A | 5/1950 | Hardin | |
| 3,222,445 A | 12/1965 | Rumberg et al. | |
| 3,260,228 A | 7/1966 | Lingl | |
| 3,404,209 A | 10/1968 | Brooke | |
| 3,568,611 A * | 3/1971 | Konrad et al. | 110/335 |
| 3,756,172 A | 9/1973 | Brereton et al. | |
| 3,824,936 A | 7/1974 | Merkle, Jr. | |
| 3,849,586 A | 11/1974 | Jacobs | |
| 3,976,424 A | 8/1976 | Krubsack | |
| 4,086,740 A * | 5/1978 | Annett | 110/336 |
| 4,103,469 A * | 8/1978 | Byrd, Jr. | 52/509 |
| 4,137,422 A | 1/1979 | Barbashin et al. | |
| 4,340,411 A * | 7/1982 | May | 110/332 |
| 4,424,756 A | 1/1984 | Merkle | |
| 4,449,345 A * | 5/1984 | Hounsel et al. | 110/336 |
| 4,463,689 A | 8/1984 | James | |
| 4,473,015 A | 9/1984 | Hounsel | |
| 4,475,470 A | 10/1984 | Merkle | |
| 4,617,672 A | 10/1986 | Enkner et al. | |
| 4,638,617 A | 1/1987 | James | |

(Continued)

FOREIGN PATENT DOCUMENTS

GB    2 051 327 A    1/1981
WO    WO 96/24698    8/1996

OTHER PUBLICATIONS

Co-Pending U.S. Appl. No. 11/799,674, filed May 1, 2007; inventors William R. Materna et al.; title Apparatus and Method for Isolating Zones of an Industrial Furnace.

Primary Examiner — Henry Yuen
Assistant Examiner — Hung D Nguyen
(74) Attorney, Agent, or Firm — Pauley Petersen & Erickson (57) ABSTRACT

This invention relates to an industrial furnace roof filler element to allow replacement of a failed heat source during operation. The filler element can include a lower portion, a module, an aperture, a protuberance, a bore and/or a heat source. This invention also relates to a method of operation for an industrial furnace wherein a failed heat source is replaced during operation of the industrial furnace.

16 Claims, 6 Drawing Sheets

U.S. PATENT DOCUMENTS

| | | |
|---|---|---|
| 4,705,475 A | 11/1987 | Coates |
| 4,720,837 A | 1/1988 | Kanada |
| 4,754,716 A | 7/1988 | Coates |
| 4,809,621 A | 3/1989 | Materna |
| 4,860,306 A * | 8/1989 | Gibb .......................... 373/112 |
| 4,864,945 A | 9/1989 | Merkle |
| 4,887,277 A | 12/1989 | Finkl |
| 4,960,058 A | 10/1990 | Materna |
| 5,241,559 A | 8/1993 | Hixenbaugh |
| 5,357,540 A | 10/1994 | Merkle et al. |
| 5,899,151 A | 5/1999 | Merkle, Jr. et al. |
| 6,058,859 A | 5/2000 | Colosimo, Jr. |
| 6,301,285 B1 | 10/2001 | Sieradzki et al. |
| 6,327,296 B1 | 12/2001 | Poloni et al. |
| 6,427,610 B1 | 8/2002 | Coates et al. |
| 6,655,955 B2 * | 12/2003 | Wachter et al. ................ 373/74 |
| 6,810,068 B2 | 10/2004 | Cotonnec et al. |
| 7,040,241 B2 | 5/2006 | Coates |

\* cited by examiner

REMOVABLE FILLER MODULE

BACKGROUND OF THE INVENTION

1. Field of the Invention

This invention relates generally to industrial furnaces and, more particularly to, an apparatus and a method for using a roof filler module to access and replace a failed heat source while the industrial furnace remains in operation.

2. Discussion of Related Art

Industrial furnaces are used in many applications such as, but not limited to, producing glass on a tin bath, heat treating, smelting and/or refining metals, calcining coke, incinerating waste and the like. Industrial furnaces are often constructed of refractory materials, such as taught by U.S. Pat. Nos. 6,427,610 and 4,960,058, the entire teachings of which are incorporated by reference into this specification. The use of hanger bricks and filler bricks for roof construction is effective in industrial furnaces, particularly for making glass.

A tin bath system in an industrial furnace is currently used to manufacture flat glass. The glass is formed in a flat sheet by dispersing molten glass across a bath of molten tin alloy and because the glass has the lower specific gravity, it floats on the molten metal. The interface of the glass and molten tin alloy is nearly perfectly flat, forming one side of the sheet. The sheet is heated by the molten metal on one side and by a heat source on the other side of the sheet, in order to allow for a process of stretching and relaxing the sheet, which results in a substantially flat top surface.

During operation of the tin bath system, a heat source sometimes fails. Over time, failure of one or more heat sources may jeopardize the glass-forming process, and in extreme cases, may require shutting the process down to repair or replace the failed heat sources. The resulting loss of production time can be very costly to a manufacturer. A filler element that allows replacement of a failed heat source during tin bath operation is highly desirable, particularly where only a small area of the industrial furnace is exposed to the surrounding environment.

SUMMARY OF THE INVENTION

It is one object of this invention to provide an improved filler element for an industrial furnace roof construction.

The above and other objects of this invention can be attained, at least in part, with a filler element for an industrial furnace roof. The filler element can have a lower portion with a hot face where the hot face can be generally rectangular and/or generally flat. The lower portion can have at least one aperture. The lower portion can engage with at least one hanger brick.

This invention can include at least one module having a generally rectangular bottom with at least one protuberance located on a bottom of the module. Each protuberance can correspond to at least one aperture of the lower portion. Each module can be moveably mounted with respect to the lower portion to engage the protuberance with the aperture. Each module can have at least one bore extending through both the module and the protuberance. Each module desirably but not necessarily has at least one lifting lug.

This invention can include at least one heat source positionable through the bore of the module and/or each heat source positionable through the aperture of the lower portion.

A filler element according to this invention can easily provide replacement of a failed heat source while the furnace is in operation. According to this invention, removing a filler element minimizes industrial furnace exposure to the surrounding environment when replacing a failed heat source.

This invention also relates to a method for operating an industrial furnace wherein at least one heat source is energized to increase an internal temperature of the industrial furnace. Each heat source can be positionable through at least one bore of at least one filler element of a roof of the industrial furnace. Each bore can extend through the module and/or the bore can extend through at least one protuberance on a bottom of the module. Each heat source can be positionable through at least one aperture in a lower portion. Each aperture can be engageable with a protuberance.

This method can include running the heat source until failure. This method can include deenergizing the failed heat source while the operating temperature of the industrial furnace is increased.

According to this invention, a guide sleeve can be placed above the module of the failed heat source. The guide sleeve can be engageable to support adjacent furnace bricks, and the guide sleeve can direct removal and/or insertion of a module.

A lifting tool can be engaged with at least one lifting lug on the module of the failed heat source. The lifting tool can be made of at least one hook and at least one slidable and/or lockable stay. The hook can engage the lifting lug and the stay can contact a surface of the module to form a firm linkage in a locked position.

According to this invention, the filler module of the failed heat source can be removed from the roof of the industrial furnace with the lifting tool and can be directed by the guide sleeve. The lifting tool can be disengaged from the filler module of the failed heat source and can engage the lifting tool with a filler module of a replacement heat source.

According to this invention, the filler module of the replacement heat source can be inserted into the roof of the industrial furnace, with the lifting tool and the guide sleeve. The lifting tool can be disengaged from the filler module of the replacement heat source, removing the guide sleeve and energizing the replacement heat source.

Other objects and advantages will be apparent to those skilled in the art from the following detailed description taken in conjunction with the appended claims and the drawings.

BRIEF DESCRIPTION OF THE DRAWINGS

The above and other objects of this invention can be better understood when the specification is read in view of the drawings, wherein.

DETAILED DESCRIPTION OF THE INVENTION

Figure 1:
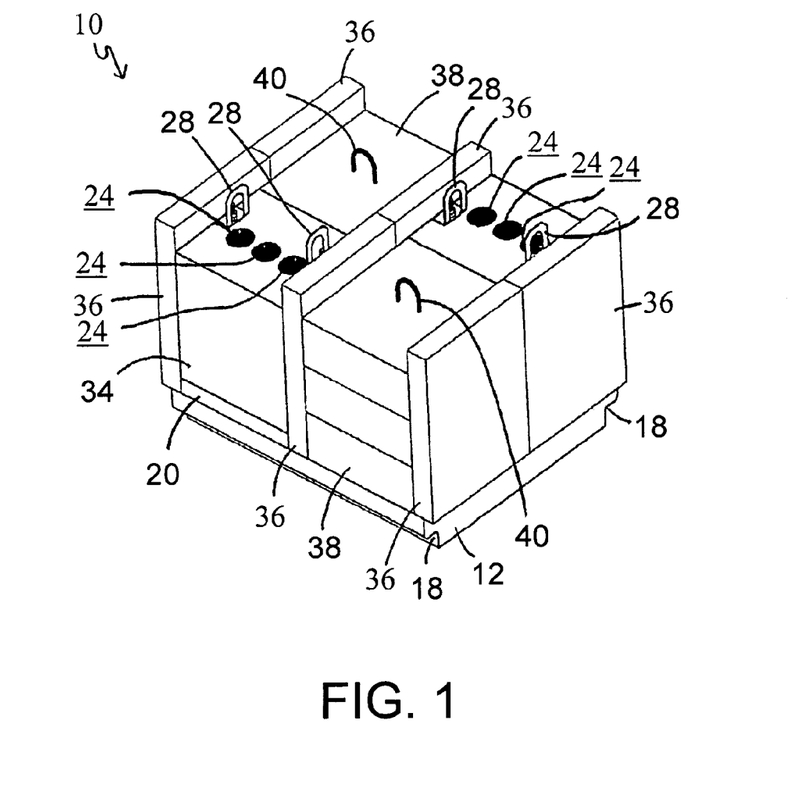
FIG. 1 is a perspective view of a filler element, according to one embodiment of this invention.

FIG. 1 shows an assembled filler element 10 according to one embodiment of this invention. Filler element 10 can comprise one or more blocks of material capable of withstanding the high temperatures of an industrial furnace. Such materials can include steel, stainless steel, alloy, chrome alloy, nickel alloy, ceramic, refractory and/or any other suitable material known to those skilled in the art. Common refractory materials can include zircon, fireclay, silica, dolomite, magnesite, alumina, chromite, sillimanite and/or silicon carbide. Suitable refractory materials can be chosen by those skilled in the art based on industrial furnace criteria such as, but not limited to, operating temperature, pH or chemistry, cost of refractory materials, insulation requirements and maintenance intervals.

Filler element 10 can be of various sizes and shapes, depending upon the needs of the industrial furnace design. Typically but not necessarily, for some glass furnaces, filler element 10 has a width of about 6 inches to about 24 inches. In one embodiment of this invention, filler element 10 has a width of about 10 inches. In another embodiment of this invention, filler element 10 has a width of about 20 inches. Filler element 10 can be oriented in any suitable direction, such as generally parallel to and/or perpendicular to a length of the industrial furnace. Any other suitable angular orientation with respect to the length of the industrial furnace, such as 30 degrees, 45 degrees, 60 degrees and/or other suitable angles, is possible.

In certain embodiments of this invention, the shape of filler element 10 is generally rectangular. Other shapes can include combinations of straight lines and/or curved lines forming regular or irregular polygons, and can be used for an industrial furnace roof. Cross sectional shapes of filler element 10 may include but are not limited to a triangle, a square, a trapezoid, a hexagon and/or an octagon. Industrial furnace roof construction can include filler elements 10 of different shapes and/or sizes used in the same roof construction, but preferably minimize a number of different types of blocks used for construction.

According to one embodiment of this invention, filler element 10 can include lower portion 12. The lower portion 12 may be referred to as a base, base member, base tile and/or base block. Typically, at least a hot face 14 of lower portion 12 can be positioned toward an inside chamber volume of the industrial furnace. Hot face 14 can be generally rectangular and generally smooth, for example to form a substantially flat roof inside the industrial furnace. Materials for lower portion 12 can be of a relatively dense refractory material such as sillimanite and/or silicon carbide.

Figure 2:
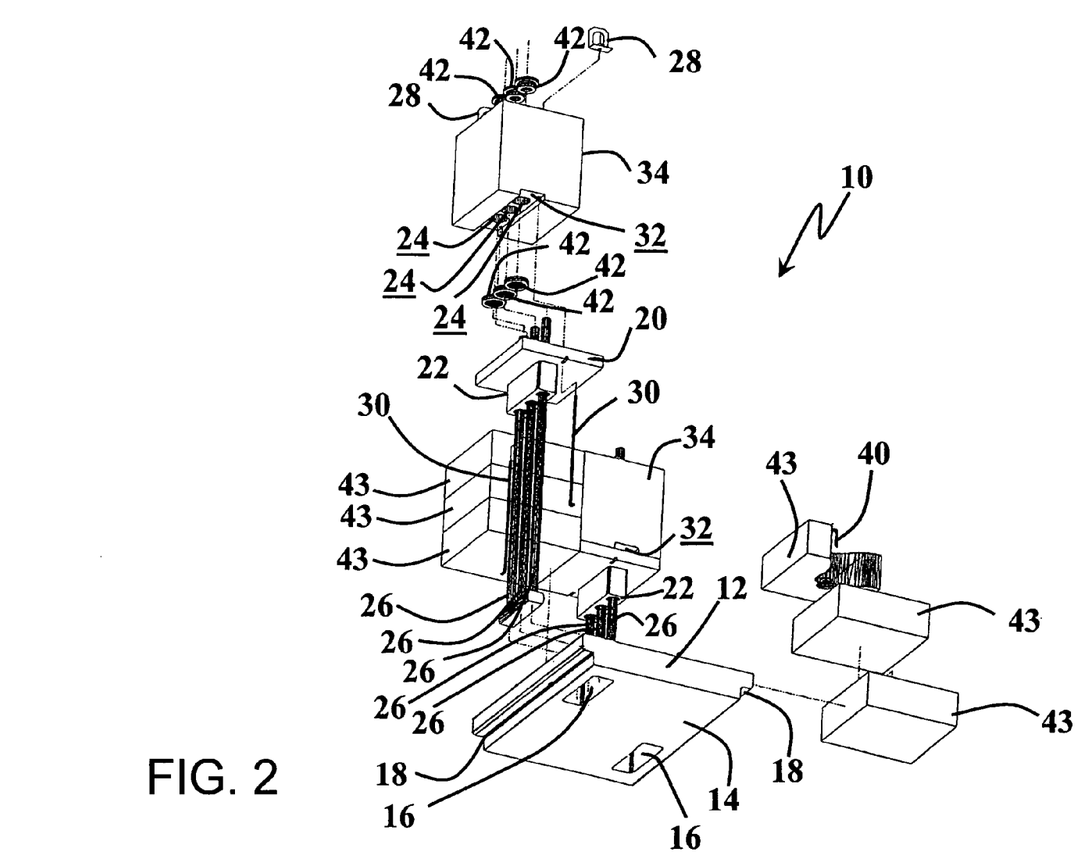
FIG. 2 is a partial exploded perspective view of a filler element, according to one embodiment of this invention.
Figure 3:
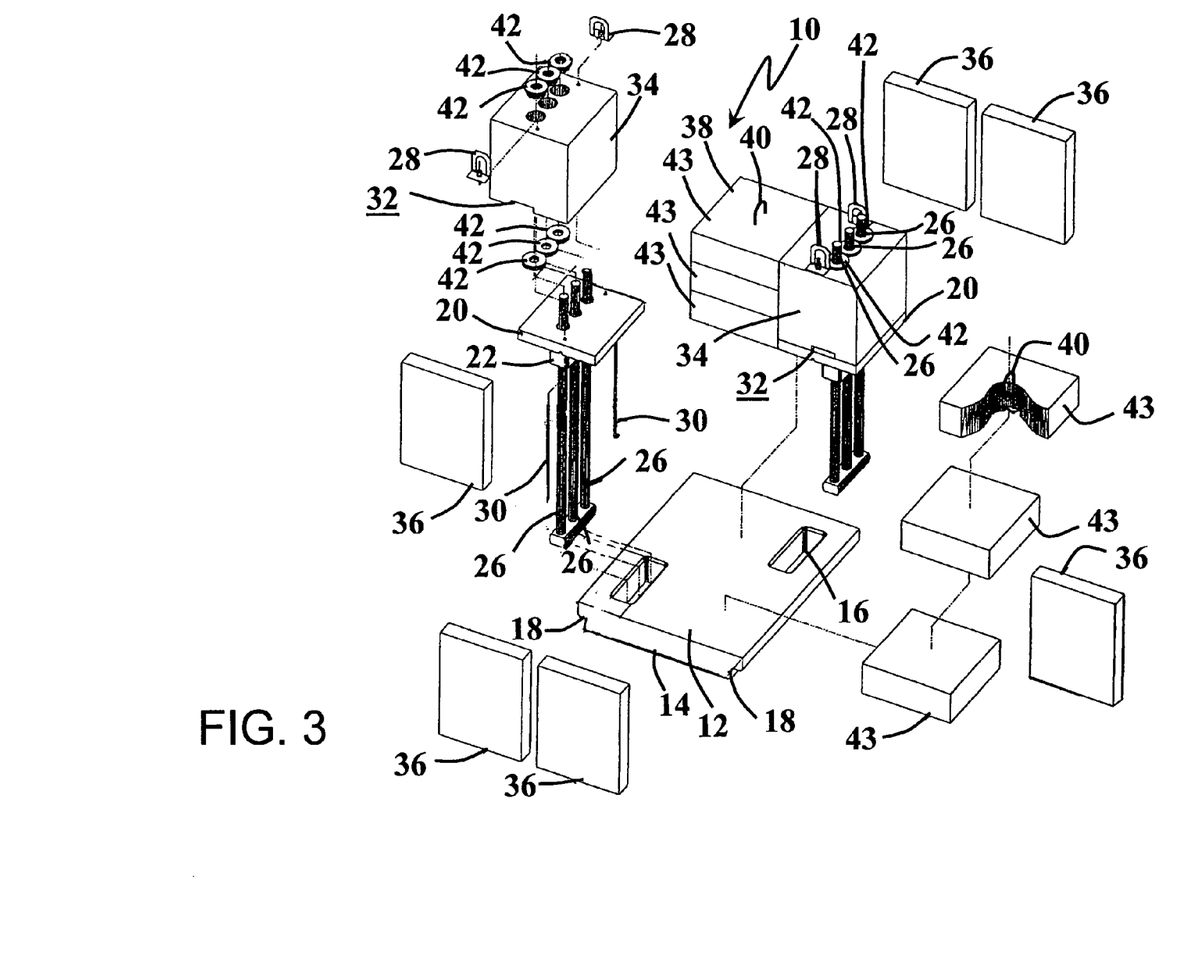
FIG. 3 is a partial exploded perspective view of a filler element, according to one embodiment of this invention.

As illustrated by FIGS. 2 and 3, lower portion 12 can include at least one aperture 16 such as a hole, a bore, a cutout, a notch and/or any other suitable void. In some embodiments, multiple apertures 16 through lower portion 12 are positioned in opposite corners from each other. Aperture 16 can be generally round, generally rectangular and/or of another suitable shape. Minimizing a size of aperture 16 can reduce exposure of the industrial furnace to the surrounding environment during replacement of a failed heat source 26. In accordance with one embodiment of this invention, at least one side of aperture 16 is tapered, angled and/or beveled, for example so that the opening of the aperture 16 is larger on a top of lower portion 12 than on a bottom of lower portion 12.

Lower portion 12 can include at least one shoulder 18, for example that forms a lip, a ridge, a notch, a groove, a recess and/or another suitable engagement for horizontal and/or vertical support by at least one hanger brick.

Filler element 10 can include module 20 to house, support and/or hold heater, heat element or heat source 26. Module 20 can be fabricated from the same or similar dense refractory material as lower portion 12. The module can be any of various shapes and/or various sizes generally equal to and/or smaller than lower portion 12 to facilitate construction and/or maintenance repairs of the industrial furnace.

According to one embodiment of this invention, module 20 has at least one protuberance 22 such as a knob, a nub and/or a lug on a bottom side. Protuberance 22 can correspond, such as in shape and/or size, to aperture 16 of lower portion 12. Protuberance 22 can engage with, enter in, nest in, rest in and/or couple with aperture 16. According to one embodiment of this invention, protuberance 22 can be tapered to correspond to a taper of aperture 16.

Module 20 can have at least one bore 24. In one embodiment of this invention, module 20 can have three bores 24 substantially in a line. Bore 24 can be a hole, an aperture and/or an opening such that heat source 26 can pass in and/or through bore 24. Desirably, module 20 has sufficient thickness, particularly in and/or around an area of bore 24 to prevent cracking and/or failure of the refractory during normal handling and/or use.

In some embodiments of this invention, bore 24 extends through module 20 and also through protuberance 22. Module 20 can be moveably mounted with respect to lower portion 12 to allow heat source 26 replacement.

Module 20 can comprise insulation layer 34 which can be a heat resistor or of a material that reduces heat transfer to a surrounding environment but may not have properties that withstand direct contact with an internal atmosphere and/or temperature of the industrial furnace. Suitable refractory material for insulation layer 34 can include various alumina-silica compounds, such as insulating fire brick and the like. Such fire brick materials can be more cost effective than dense refractories that can be used in lower portion 12.

Insulation layer 34 may have slot 32 as shown in FIG. 3, according to one embodiment of this invention. Slot 32 or any other suitable groove, channel and/or trough may accommodate washers 42, and can be included in the assembly of filler element 20. Washer 42 or any other suitable spacer, ferrule and/or disc can prevent damage to softer materials used in insulation layer 34. One or more washers 42 can be used above and/or below insulation layer 34. According to certain embodiments of this invention, washers 42 are ceramic.

Rod 30 can be used to structurally attach and/or secure module 20 and insulation layer 34 together. In one embodiment of this invention, rod 30 is constructed of a high alloy material capable of withstanding the operating temperatures of the industrial furnace. Rod 30 can be threaded and/or have a hook or another connector on one or both ends. Rod 30 can also secure or attach lifting lug 28 to module 20. Lifting lug 28 can be a loop, an eyelet and/or have any other suitable design to remove module 20. A nut can be used to secure or attach lifting lug 28 to rod 30.

Heat source 26 can be an electric induction heater, an electric resistance heater, an electric arc heater, a radio frequency generator, a combustion device and/or any other suitable equipment for supplying thermal energy or transferring heat to an industrial furnace. Electricity requirements can include low voltage, high voltage, alternating current, direct current, high amperage, low amperage and/or any other suitable supply. Fuels for combustion may include, for example, hydrogen, natural gas, liquid hydrocarbons, coal, wood and/or other suitable material capable of releasing heat when burned.

According to one embodiment of this invention, heat source 26 includes a plurality, such as three, electric resistance heater elements. Each heater element can be in the shape of a rod that can be bundled and/or fixed to another rod with a block at a bottom or lower end of the rods, to provide stability.

Filler element 10 can comprise at least one seal brick 36. According to one embodiment of this invention and as shown in FIG. 1, filler element 10 can include six seal bricks 36. Seal brick 36 can be of, for example, insulated fire brick material. Seal bricks 36 can act as an end, a cap, a divider and/or a spacer block. Seal bricks 36 can remain loose until placement in an industrial furnace and/or can be secured using one or more fastening methods, such as those described generally below.

Insulation block 38 can be part of filler element 10, depending on the insulation and/or the heating requirements of the industrial furnace. Insulation block 38 can be referred to as a blank module. According to one embodiment of this invention, there is at least one insulation block 38 for each module 20. Insulation blocks 38 and modules 20 can alternate along a length of the industrial furnace. One or more layers or strata 43 can form insulation block 38. Strata 43 can be affixed with one or more fastening methods described generally below. Suitable materials for insulation block 38 include insulating fire brick and/or other refractory materials, such as those described above. Insulation block 38 may also include a lifting eye or loop 40.

Refractory bricks and/or shapes can have outside corners rounded, squared and/or chamfered. The inside corners of the refractory bricks and/or shapes can be squared and/or rounded. Filler element 10 of this invention can readily be adapted for use in refractory structures having arches, curves, vertical walls and/or other angles and/or other locations in the industrial furnace that may require heat source 26.

Possible methods of fastening refractory materials together include mechanical fasteners, such as screws, dowels, clamps, pins, nails, interference fit elements and/or other suitable connection devices. Other fastening methods may include the use of cements, mortars, mastic, adhesives and/or other suitable binders.

Figure 4A:
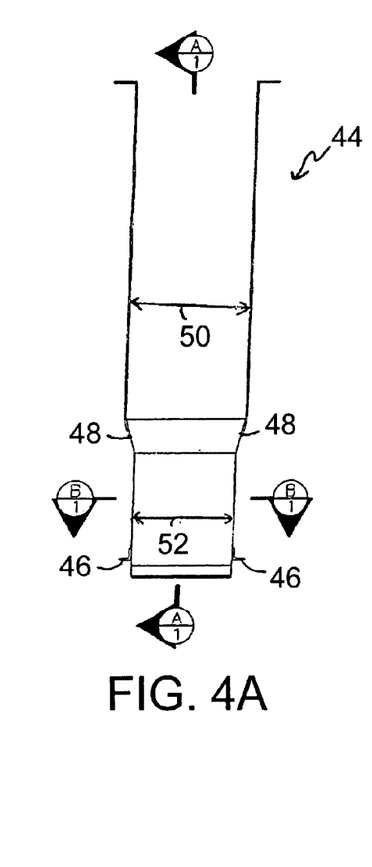
FIG. 4A is front view of a guide sleeve, according to one embodiment of this invention.
Figure 4B:
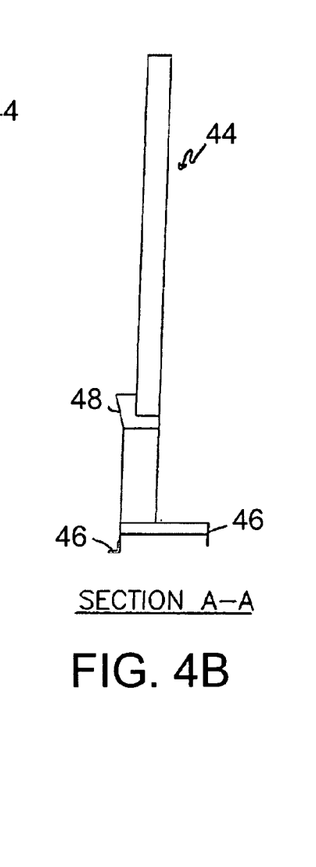
FIG. 4B is a sectional view of the guide sleeve of FIG. 4A, taken along line A-A as shown in FIG. 4A, according to one embodiment of this invention.
Figure 4C:
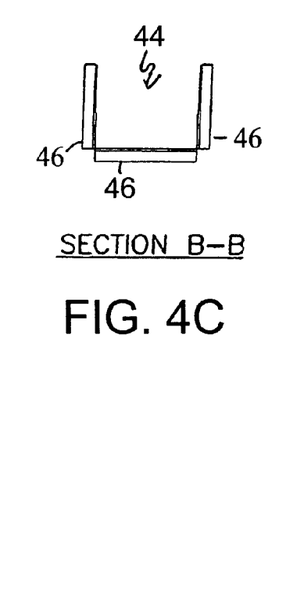
FIG. 4C is a sectional view of the guide sleeve of FIG. 4A, taken along line B-B as shown in FIG. 4A, according to one embodiment of this invention.

Filler element 10 may comprise guide sleeve 44 as shown in FIGS. 4A, 4B and 4C, according to some embodiments of this invention. Guide sleeve 44 can comprise brace 46 to support, stabilize, steady and/or facilitate placement of guide sleeve 44 on, above, and/or around module 20. According to certain embodiments of this invention, guide sleeve 44 is constructed of sheet metal and includes taper 48 where upper width 50 is greater than lower width 52. Taper 48 can assist, guide, direct, and/or aid in the insertion of module 20 while installing a replacement heat source 26. Guide sleeve 44 can hold seal brick 36, module 20 and/or insulation block 38 in position, such as during replacement of a failed heat source 26.

Figure 5A:
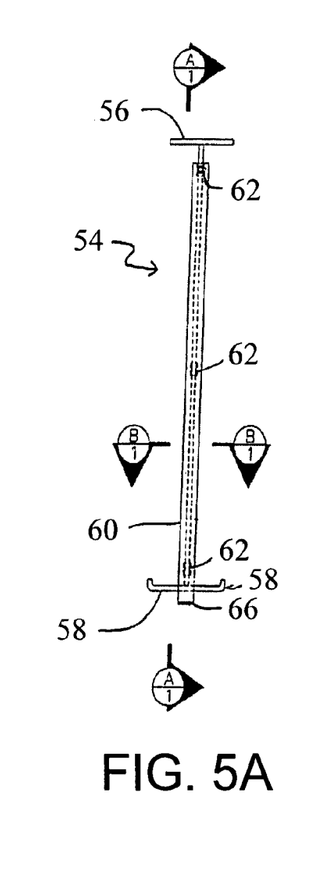
FIG. 5A is a front view of a lifting tool, according to one embodiment of this invention.
Figure 5B:
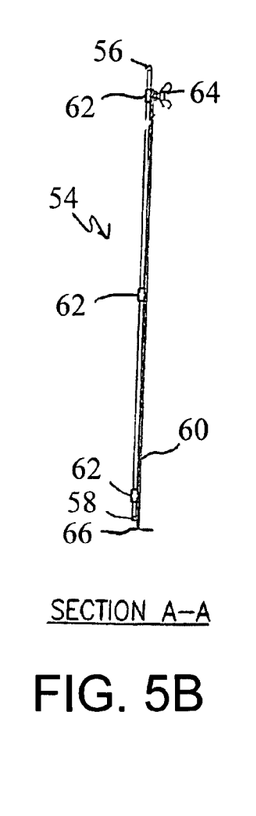
FIG. 5B is a sectional view of the lifting tool of FIG. 5A, taken along line A-A as shown in FIG. 5A, according to one embodiment of this invention.
Figure 5C:
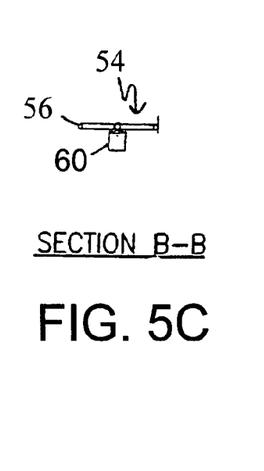
FIG. 5C is a sectional view of the lifting tool of FIG. 5A, taken along line B-B as shown in FIG. 5A, according to one embodiment of this invention.

Filler element 10 may comprise lifting tool 54 as illustrated in FIGS. 5A, 5B and 5C, and according to certain embodiments of this invention. Lifting tool 54 can comprise handle 56 for lifting, raising, lowering and/or positioning lifting tool 54. Handle 56 can be replaced by any other suitable mechanical linkage or device to interface with a powered lifting device such as a crane, a chain fall and/or a hoist. Lifting tool 54 may comprise hook 58 for engaging lifting lug 28. Stay 60 can be rigid flat stock material and can have at least one collar 62 to position lifting tool 54 and provide a slidable attachment for lifting tool 54 with respect to stay 60. Stay 60 can also comprise lock mechanism 64, so that when engaged, lock mechanism 64 fixes lifting tool 54 with respect to stay 60. According to one embodiment of this invention, lock mechanism 64 can comprise a wing nut and a threaded connection to provide manual engagement.

Lifting tool 54 can also comprise foot 66 and may be flat stock bent to form a 90-degree angle, for example. According to one embodiment of this invention, foot 66 contacts a top of module 20 so that when lifting tool 54 engages lifting lug 28, a rigid and/or a firm connection and/or coupling can resist twisting.

This invention can comprise a method for industrial furnace operation. One method can include energizing heat source 26, for example to complete an electric circuit for a resistance heater. The method may comprise operating heat source 26 until failure, such as when a current discontinuity occurs in a resistance heater. According to one embodiment of this invention, the failed heat source 26 can be deenergized for safety reasons.

Figure 6:
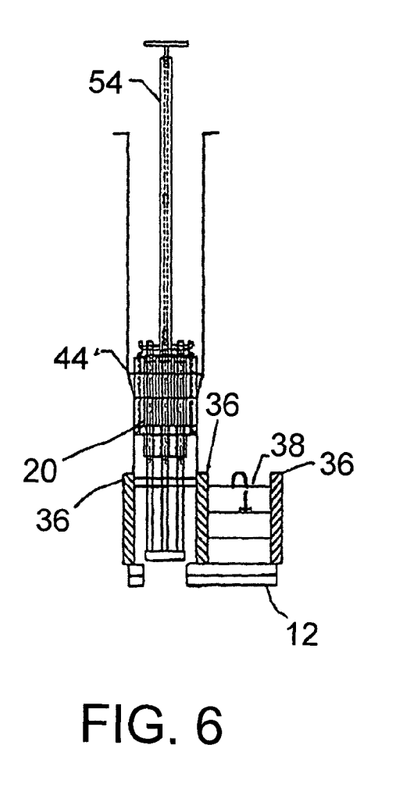
FIG. 6 is a partial sectional side view showing a step for replacing a failed heat source.

As shown in FIG. 6, the method can further comprise engaging or placing guide sleeve 44 on and/or above module 20 with failed heat source 26 while operating the industrial furnace. The method may also comprise positioning lifting tool 54 on module 20 with failed heat source 26 to engage hook 58 with lifting lug 28 and contacting a top of module 20 with foot 66 of stay 60 so that a rigid and/or firm connection can be made when applying lock mechanism 64. The unitized lifting tool 54 and module 20 can be removed using the guide sleeve 44.

The lifting tool 54 can be removed from module 20 with the failed heat source 26 and engaged with a second module 20 with a replacement heat source 26, to allow insertion into the roof of the industrial furnace, with guide sleeve 44. Lifting tool 54 can be removed from module 20 with the replacement heat source 26. Guide sleeve 44 can be removed. Heat source 26 can then be energized.

While in the foregoing specification this invention has been described in relation to certain embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A filler element for an industrial furnace roof comprising:
   a lower portion with a hot face and a top face opposite the hot face, the hot face having a generally rectangular and a generally flat shape, the lower portion having an aperture and the lower portion engageable with at least one hanger brick;
   a module having a generally rectangular bottom with a protuberance located on a bottom of the module, the protuberance correspondingly sized to fit within the aperture of the lower portion, the module mounted entirely upon the lower portion top face opposite the hot face and liftable from the top face, the protuberance engaging with the aperture when the module is mounted on the lower portion, the module having at least one bore extending through both the module and the protuberance, the at least one module having at least one lifting lug, the module including at least one seal brick positionable above the lower portion to insulate the industrial furnace from a surrounding environment; and a heat source positionable through the bore of the module and the protuberance, wherein a portion of the heat source is positioned through the bore of the protuberance when the protuberance is fit within the aperture and extends outward from the hot face.

2. The filler element of claim 1, wherein the lower portion is made from a dense refractory.

3. The filler element of claim 1, wherein the module includes seal bricks, insulation blocks, and insulation layers positionable above the lower portion to insulate the industrial furnace from a surrounding environment.

4. The filler element of claim 3, wherein the seal bricks, the insulation blocks, and the insulation layers are made from insulated fire brick.

5. The filler element of claim 3, wherein six seal bricks surround the at least one insulation layer.

6. The filler element of claim 3, further comprising a rod to fix the insulation layer and the lifting lug.

7. The filler element of claim 3, wherein the insulation layer has a slot on a bottom.

8. The filler element of claim 3, wherein the insulation block has at least one lifting loop.

9. The filler element of claim 3, wherein the insulation block includes three strata.

10. The filler element of claim 1, further comprising washers to support a heat source.

11. The filler element of claim 1, wherein the heat source is an electric heater element.

12. The filler element of claim 1, wherein the protuberance is tapered from a top to a narrower bottom and the aperture is correspondingly tapered from a top to a narrower bottom.

13. The filler element of claim 1, wherein at least three bores extend through each module.

14. The filler element of claim 1, wherein two lifting lugs mount to a top of the module.

15. A filler element for an industrial furnace roof comprising:

a lower portion including a hot face and a top face opposite the hot face, the hot face having a generally rectangular and a generally flat shape, the lower portion including first and second apertures therethrough and extending from the top face to the hot face, and the lower portion including or forming a shoulder on at least two opposing sides which are each engageable with a hanger brick of the furnace roof;

first and second modules each having a generally rectangular bottom that is mountable on the top face of the lower portion, the first module including a first protuberance extending from the bottom and correspondingly sized to fit within the first aperture of the lower portion when the first module is mounted on the lower portion, the first module including a first bore extending through both the first module and the first protuberance, the second module including a second protuberance extending from the bottom and correspondingly sized to fit within the second aperture of the lower portion when the second module is mounted on the lower portion, the second module including a second bore extending through both the second module and the second protuberance, and the first and second modules each including a lifting lug on an end opposite the respective protuberance;

a first heat source positionable through the first bore to extend from the first protuberance, wherein a portion of the first heat source passes through the first aperture within the first protuberance;

a second heat source extending through a second bore; and at least one seal brick positioned above the lower portion and at least one of around at least one of the first and second modules or between the first and second modules to insulate the industrial furnace from a surrounding environment.

16. The filler element of claim 15, wherein the first module is set upon and not fixed to the lower portion when mounted.

* * * * *